United States Patent [19]

Lillard et al.

[11] 4,049,092

[45] Sept. 20, 1977

[54] CURRENT CONDUCTOR SYSTEM

[75] Inventors: Richard E. Lillard; William M. Cope, both of Lynchburg, Va.

[73] Assignee: H. K. Porter Company, Inc., Lynchburg, Va.

[21] Appl. No.: 723,240

[22] Filed: Sept. 15, 1976

[51] Int. Cl.² .............................................. B60M 1/20
[52] U.S. Cl. ..................................... 191/40; 174/99 B; 191/22 R; 191/33 R; 191/44.1; 339/22 T
[58] Field of Search ...................... 191/22 R, 29 R, 30, 191/31, 32, 33 R, 39, 40, 42, 43, 44.1, 45 R, 45 A, 44, 49, 59.1; 174/99 B, 99 E, 129 B, 129 R, 133 B, 133 R; 339/22 B, 22 T

[56] References Cited

U.S. PATENT DOCUMENTS

| | | | |
|---|---|---|---|
| 2,422,132 | 6/1947 | Saiter | 191/45 A |
| 2,548,986 | 4/1951 | Mayer | 191/39 |
| 2,824,913 | 2/1958 | Taylor | 191/43 |
| 2,933,567 | 4/1960 | Mageoch | 191/40 |
| 2,990,458 | 6/1961 | Mageoch | 191/44.1 |
| 3,172,511 | 3/1965 | Hollander | 174/99 B |
| 3,892,299 | 7/1975 | Kilburg | 191/29 R |

Primary Examiner—Trygve M. Blix
Assistant Examiner—Reinhard J. Eisenzopf
Attorney, Agent, or Firm—Edelson and Udell

[57] ABSTRACT

An electric current conducting bar of generally X-shaped configuration in transverse cross-section for use in an electric transmission system wherein a plurality of said bars of modular lengths, jointed in longitudinally alined end-to-end relation by various coupling assemblies, are fitted with insulating sheaths of generally inverted U-shape, also of modular lengths, which protectively cover not only the conductor rail per se and their coupling assemblies but also the current collector shoe which moves in electrical contact with the bar without any utilization of the insulating sheath primarily as a guide for the collector shoe. In a modified form of the X-shaped bar, the upper branches thereof are extended horizontally outward from opposite sides of the mid-section of the bar to provide the latter with a flat top having opposed longitudinally extending edges which are respectively accommodated in opposed longitudinally extending inner grooves formed in the insulated sheath. Although these inner grooves of the insulating sheath have no function in respect to the bar of the full X-shaped cross-section, the sheaths are formed to include said inner grooves so that the sheaths are of a universal form adapted to be applied to either form of the conductor bar.

13 Claims, 20 Drawing Figures

CURRENT CONDUCTOR SYSTEM

This invention relates generally to electrical distribution systems and more particularly to improvements in the design and construction of systems for supplying electric energy to a movable vehicle or work utility from one or more of a fixedly positioned array of insulated conductors each of which is formed of a plurality of longitudinally alined conductor bars or rails connected together in end-to-end relation to provide any desired length of conductor along which may travel in continuous contact therewith the sliding contact shoe of a current collector attached to and movable with the work utility.

In the electrical distribution systems to which this invention relates the fixed conductor thereof is usually of a length considerably longer than that in which, in actual practice, it may be manufactured and shipped and thus it is necessary as a practical matter to manufacture the conductor bar or rail is relatively short modular lengths convenient to be handled which must then be connected in end-to-end relation when installed for use. Because of the always changing working conditions to which such extended lengths of the conductors are subjected during use and operation thereof in a particular installation, the connections between the longitudinally aligned adjoining modular lengths of the conductor bars must be mechanically and electrically secure for safe and efficient use of the system. Also, the full length of the conductor of the system must be adequately insulated and still allow for uninterrupted travel therealong and in electrical contact therewith of the moving trolley mechanism through which electrical energy is supplied from the conductor to the moving work utility.

Not only must be the conductor itself be safely insulated as just mentioned, but also it must be of a construction which permits current supply feed connections to be made to it at any one or more points along its length, as well as the incorporation therein splice joint, expansion joint and isolation joint assemblies and the like as may be required, all of which must be insulatingly covered without interfering with the free travel of the aforesaid trolley mechanism of the moving work utility.

Having in mind the foregoing, it is an object of this invention to provide a conductor bar or rail of a novel transverse cross-section, best described as being generally of X-shape in its cross-section, which ideally lends itself to use therewith of complementally shaped components for rigidly splicing together in alined and abutting relation two adjoining lengths of the conductor rails, for joining together two such conductor rails by an expansion joint having a flexible electrically conductive shunt and for insulating adjacent sections of the conductor rail from each other without interfering with the free travel of the aforesaid trolley mechanism associated with each rail.

It is a further object to provide rigid splice and expansion joints for the interconnected rail sections of the system current conductor which are so complementally shaped in conformity with and are so fitted in and secured the upper part of the X-shaped rail as to provide an electrical efficiency for the joint which exceeds that of an equal length of the conductor bar or rail itself when compared by the resistance test method (NEMASGI-5.02).

Still another object of the present invention is to provide a conductor bar or rail of such cross-section, namely, the X-shaped section above mentioned, which provides in its lower part an inverted V-shaped track which serves effectively to guide the contact shoe of the current collector assembly (trolley mechanism) along the conductor rail without necessitating resort to or assistance of the conductor rail insulating sheath for that purpose, thereby freeing the sheath of any strains or stresses that might be imposed thereon by the current collector shoe as would tend to break or otherwise disrupt the integrity of the insulating sheath.

Still another important object of the invention is to provide an insulating sheath for the conductor rail which is readily applied thereto and yet is easily removable as necessity may require, which so completely covers the rail as to practically eliminate the hazard of accidentally touching the electrically energized rail or the current collecting shoe operatively engaged therewith, which prevents accidental dislodgement or complete separation of the current collecting shoe from its associated conductor as it travels along the same and which in and of itself is of such rigidity and high tensile strength as enables it to be used in conjunction with insulating hangers or anchors secured thereto at any desired point or points along the sheathed conductor rail for firmly and securely supporting the latter in uniformly spaced parallel relation of the line of travel of the work utility.

Other objects and advantages of the invention will appear more fully hereinafter, it being understood that it consists in the combination, construction, location and relative arrangement of parts all as described in the following specification, as shown in the accompanying drawings and as finally pointed out in the appended claims.

Referring now more particularly to the drawings, it will be observed that the conductor bar or rail of the present invention is basically of an X-shaped configuration, one form of which is shown in FIGS. 1 to 11 inclusive, and another in FIGS. 14 to 17 inclusive and 20. Both forms of these rails may be formed of any suitable electrically conductive material, such as aluminum, copper, stainless steel, bronze or electro-galvanized steel and depending upon the material used the rails may be extruded, rolled or otherwise processed into their cross-sectional shapes as shown and cut to modular lengths, generally about 10 feet, convenient for incorporation in a current conducting system. The X-shaped rail shown in FIGS. 1 to 11 inclusive which includes upwardly extending diverging branches having inturned extremities to provide a cavity for receiving a splice bar or other coupling elements described hereinafter is designed for use in current conductor systems wherein substantial amounts of electrical energy (e.g.—350 amperes) are required for operation of a moving vehicle or other work utility, while the X-shaped rail shown in FIGS. 14 to 17 and 20 having its top portion formed of oppositely extending coplanar branches is designed for use in current conductor systems requiring the use of only moderate amounts of electrical energy (e.g.—90 amperes). A feature common to both forms of the rail conductor is the open configuration thereof, which renders them not only lightweight in construction without any reduction in their strength and rigidity as compared with rails of solid cross-section. Further, both forms of the conductor rail are so designed as to enable them to be effectively insulatingly enclosed within an insulated sheath or cover which in itself is designed to be interchangeably applied to either form of the conductor rail.

It will be understood that the terms upper and lower, top and bottom, above and below, and the like as may appear in the following description are only relative to one another and are used as a matter of descriptive convenience since it is apparent that the specific orientation of the conductors may vary depending upon the physical requirements of the system in which they are incorporated.

THE RELATIVELY HIGH AMPERAGE CONDUCTOR BAR

Figures 2, 9, 11:
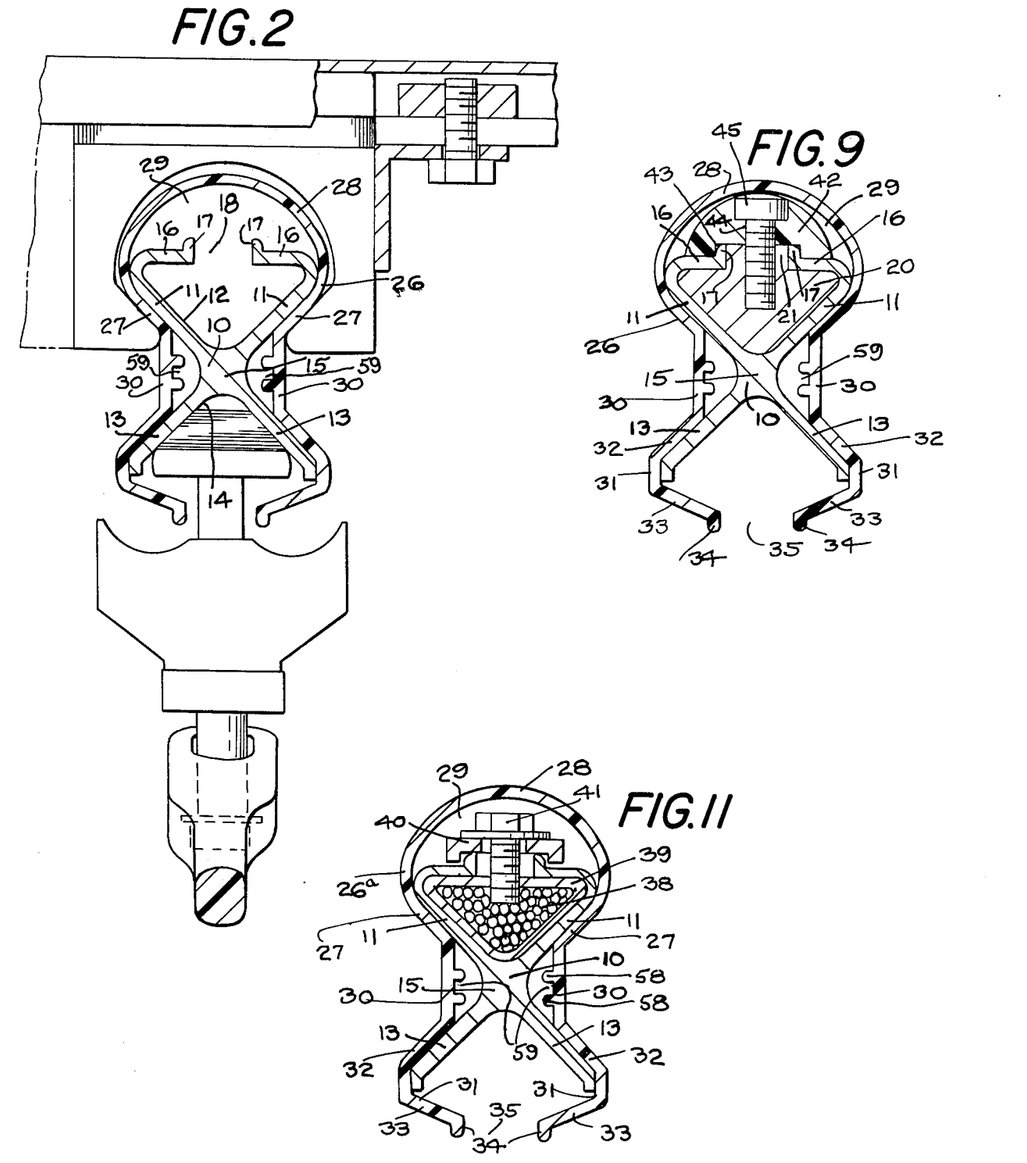
FIG. 2 is a transverse sectional view of one of the conductor bar assemblies and its support as taken along the line 2—2 of FIG. 1.
FIG. 9 is a transverse sectional view taken on the line 9—9 of FIG. 8.
FIG. 11 is a transverse sectional view taken on the line 11—11 of FIG. 10.

Referring now to the conductor bar or rail of the present invention designed to supply a relatively large amount of electrical energy to the movable work utility, as is shown for example in FIG. 2, it will be noted that this conductor rail 10 is of a generally full X-shaped cross-section having a top pair of diverging branches 11—11 forming an upwardly presenting V-shaped channel 12 and a bottom pair of diverging branches 13—13 forming a downwardly presenting inverted V-shaped channel 14, the apices of which channels are joined in back-to-back relation to provide the rail with an intermediate body portion or waist 15 of substantially reduced transverse dimension.

The diverging branches 11—11 of the top channel 12 of the rail 10 are respectively inturned to provide a pair of horizontally disposed co-planar flanges 16—16 the free ends of which terminate in vertically extending parallel lips 17—17 horizontally spaced apart to define therebetween an open slot 18 which extends longitudinally along the full length of the rail in free communication with the interior of the channel 12. Thus, the upper channel 12 and its inturned top flanges 16—16 form a longitudinally extending open-topped cavity in the upper half portion of the conductor bar or rail 10. It will be seen that in its vertical cross-section the conductor rail 10 is symmetrical with reference to its longitudinally extending vertical median plane and thus the longitudinally extending open slot in the top of the rail is centered between the opposite sides of the rail.

The conductor rails 10 in whatever number thereof is required for any given current conductor installation are adapted to be joined together in longitudinally alined end-to-end relation by the means and in the manner now to be described to provide for uninterrupted and unimpeded travel along the full length of the system of the current collector through which current is supplied to the moving work utility.

HIGH AMPERAGE SPLICE JOINT

Figure 6:
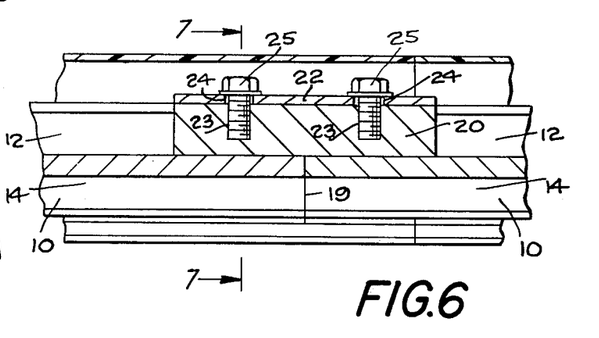
FIG. 6 is a longitudinal sectional view showing a pair of adjoining lengths of current conducting bars or rails of the present invention electrically spliced together and encased in their insulating sheaths.
Figure 7:
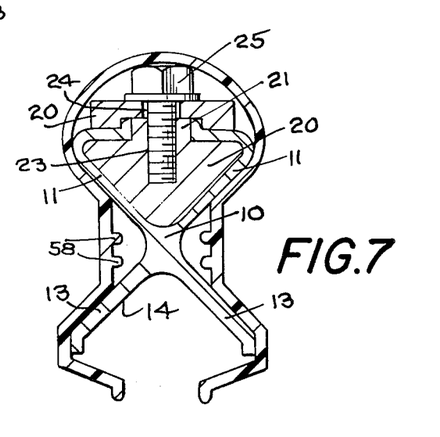
FIG. 7 is a transverse sectional view of the insulated spliced joint as taken on the line 7—7 of FIG. 6.

FIGS. 6 and 7 show the means of the present invention for electrically connecting the adjoining ends of a pair of conductor rails 10—10. In this instance the ends of the rails to be joined are disposed in abutting relation, as at their junction point 19. A splice bar 20 of electrically conductive material has its opposite end portions inserted into the above mentioned open-topped cavities of the abutting rails so that it commonly overlies the adjoining end portions of the latter. This splice bar 20 is basically of a generally triangular cross-sectional contour conforming to that of said rail cavity so that when it is tightly secured in the cavities of the abutting rails 10—10 its external surfaces intimately engage and make good electrical contact with the corresponding internal surfaces of the rail cavities. The splice bar 20 is provided along its top side with a longitudinally extending vertically projecting rib 21 which fits snugly in the slots 18 formed in the tops of the rails and serves as a spline to insure rectilinear alinement of the coupled rails.

Disposed in overlying relation to splice bar 20 is a clamp member 22 the bottom face of which is longitudinally undercut to provide a recess which commonly receives the vertically projecting rib 21 of the splice bar and the upwardly projecting slot-forming lips 17—17 of the adjoining rails. The splice bar is provided with longitudinally spaced threaded holes 23—23, at least one for each portion of the splice bar which extends into an end of the conductor bar or rail to be spliced, while the clamp member 22 is provided with correspondingly spaced through-holes 24—24 through which are projected clamp bolts 25—25 for threaded engagement with the splice bar 20. It will be apparent that upon tightly threading the bolts 25—25 into the splice bar 20 the latter and its coacting clamp member 22 will be drawn tightly together to clamp therebetween the abutting end portions of the spliced rails. The splice joint as just described, when formed of material having an electrical conductivity equal to that of the rail itself, has itself an electrical efficiency of greater than 100% efficiency when compared by the resistance test method (NEMASGI-5.02) to an equal length of the conductor rail 10.

THE CONDUCTOR BAR INSULATING SHEATH

Figures 1, 12, 13:
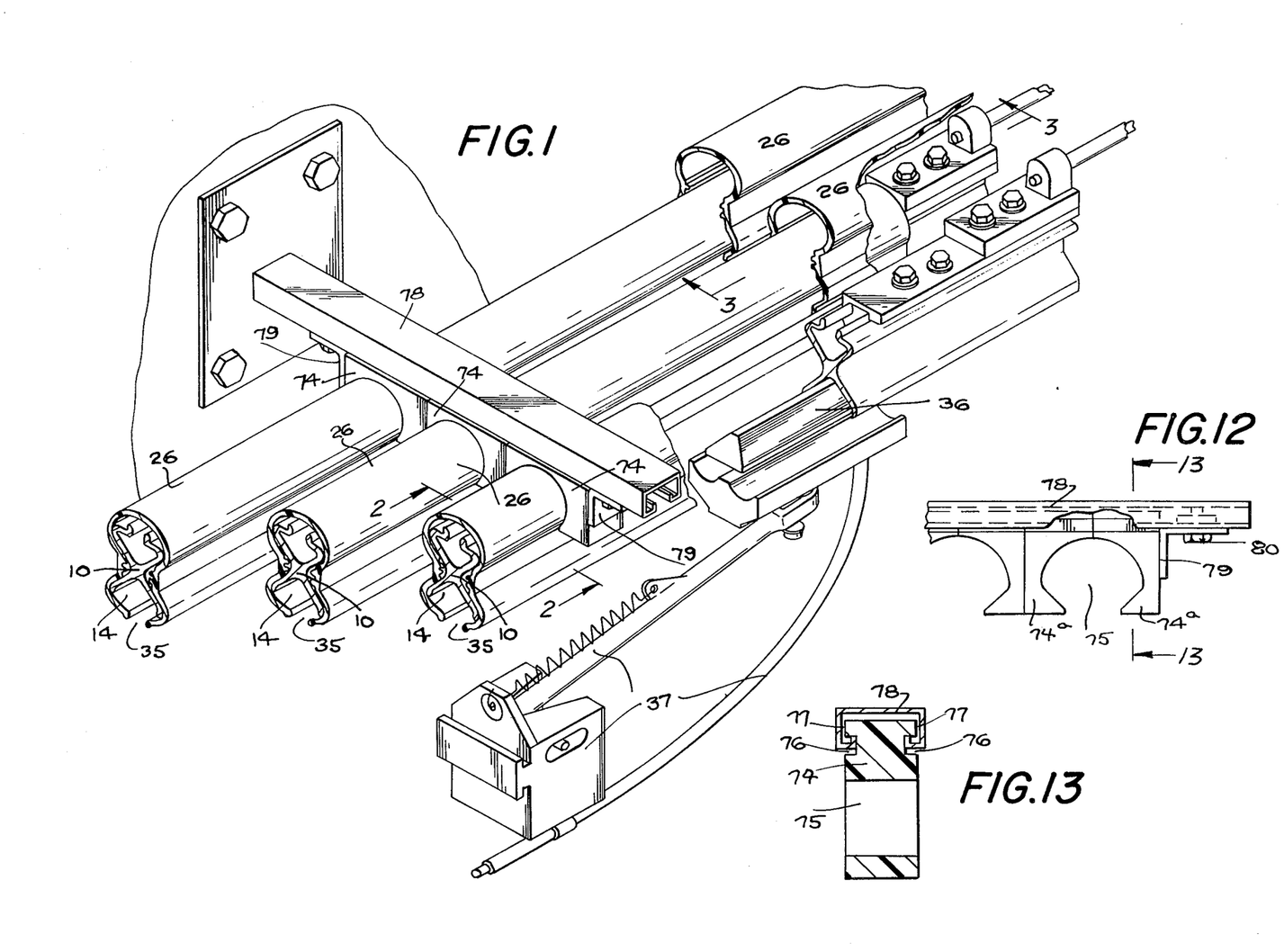
FIG. 1 is a perspective view showing a mounted section of an insulated three-phase conductor system equipped with current feeder assemblies constructed in accordance with and embodying the principles of the present invention, only one of the conductors being shown with its current collector operatively associated therewith.
FIG. 12 is a partial side elevational view of an insulating hanger assembly for supporting the conductor rails.
FIG. 13 is a transverse sectional view taken on the line 13—13 of FIG. 12.

The X-shaped conductor rails 10 are covered by elongated insulating sheaths 26 which are longitudinally alined to substantially enclose the alined conductor rails except in certain vicinities thereof as will be described later. These sheaths, as shown for example in FIGS. 1 and 2, are preferably of the same modular lengths as those of the conductor rails but may be cut to any lesser length as may be required for a particular installation. Each sheath 26 has a uniform cross-section throughout its length of generally inverted U-shape to provide a pair of laterally spaced downwardly converging side wall portions 27—27 integrally joined at their top ends by a transversely curved bridging portion 28, which top and side wall portions conjointly form a longitudinally extending closed-top duct or plenum 29 in the upper part of the sheath for receiving the upper part of the X-shaped conductor rail 10. The downwardly converging portions 27—27 of the sheath side walls which respectively overlie the external surfaces of the upwardly diverging branches 11—11 of the conductor rail are downwardly extended to provide a pair of laterally spaced parallel sections 30—30 which embrace therebetween the narrow intermediate body portion or waist 15 of the rail. These laterally spaced parallel sections 30—30 of the sheath are in turn respectively, extended downwardly and oppositely bowed to provide a pair of opposed generally C-shaped channels 31—31 which present inwardly toward each other, each having an outwardly sloping upper section 32 and an inwardly sloping lower section 33 terminating in a freely depending lip 34. These oppositely facing C-shaped channels 31—31 of the insulating sheath accomodate therebetween the lower divergent branches 13—13 of the conductor rail which form its downwardly presenting inverted V-shaped channel 14. The slope of the sections 32—32 of the sheath is such that they closely overlie the external surfaces of the lower branches 13—13 of the sheathed conductor rail, while the slope and transverse widths of the bottom-most lipped sections 33—33 of the sheath are such that they completely enclose the bottom end of the sheathed conductor rail except for a longitudinal slot 35 formed between the depending lips 34—34 of the sheath.

As is most clearly shown in FIG. 2, the channel 14 formed by bottom pair of the downwardly divergent branches 13—13 of the conductor rail constitutes in effect an inverted V-shaped track which is adapted to be electrically engaged by a complementary shaped current collecting shoe 36 of a current collector assembly 37 carried by and movable with the work utility (not shown) to which operating current is to be supplied. Since this current collector assembly forms no part of the present invention, none of its structural details are described except to point out that the shoe per se is preferably in the form of an elongated block of conducting material having a cross-section of a generally triangular shape and that it is upwardly spring-biased, (as see FIG. 1) to constantly maintain its top ridge and opposite side wall surfaces in electrical engagement with the corresponding internal surfaces of the aforesaid inverted V-shaped track portion of the conductor rail.

It will be noted that except for the slot 35 in its bottom end, the sheath 26 completely encases not only the current conductor rail but also the current collector shoe 36 which moves along the rail. The bottom slot 35, which is of a width only sufficient to provide for free movement of the collector assembly along the rail, greatly reduces the possibility of any person making inadvertent contact with the rail or with the collector shoe riding on the rail. It will be noted also that the inwardly sloping bottom-most sections 33—33 of the sheath are so relatively disposed in relation to the current collector shoe (as see FIG. 2) as to hold the latter captive in the bottom of the sheath should it be inadvertently derailed or otherwise unintentionally dislodged from the conductor rail.

The sheath 26 is formed of any suitable plastic type material that is highly non-conductive and which lends itself to formation by extrusion or any other thermoforming process. The plastic material should be such as will provide the sheath with substantial rigidity and yet be of a resiliency or flexibility as will enable the side walls of the sheath to be spread apart sufficiently to permit it to be snap-fitted over or slipped end-wise onto the conductor rail and also to permit the current collector shoe to be inserted into or removed from its rail-contacting position as shown in FIG. 2 by way of the bottom slot 35 provided in the sheath.

It will be understood that the sheath 26 may be sectionalized or cut to any desired length as may be required for a particular installation of a conductor system employing the conductor rails of the present invention and it will be noted that where the adjoining rails are splice jointed as hereinbefore described by use of the splice bar 20 and its associated parts, a separately cut short section of the sheath may be fitted between longer alined lengths of the sheath to cover the region of the splice between the ends of the adjoining conductor rails. In this connection it is important to observe that the duct or plenum 29 formed by the transversely curved top 28 and the adjoining side wall sections of the sheath extends sufficiently above the top of the sheath-encased conductor rails to provide an insulated space of a transverse girth ample to accomodate therein all of the components of the splice joint above described.

HIGH AMPERAGE EXPANSION JOINT

Figure 10:
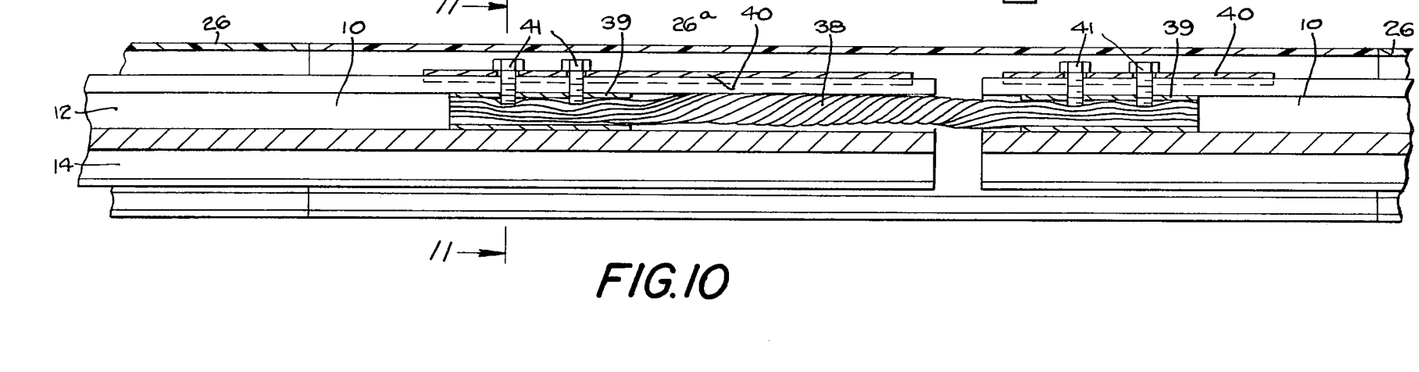
FIG. 10 is a longitudinal sectional view showing an expansion joint assembly for electrically connecting a pair of adjoining current conducting rails of the present invention.

Such a sectionalized length of the sheathing 26 is shown for example in FIGS. 10 and 11 wherein a short length of the sheath, designated 26a, is interfitted between modular lengths of the alined sheaths 26—26 to cover what in this instance is an expansion joint between the spaced-apart ends of a pair of longitudinally alined conductor rails 10. This expansion joint is made up of a flexible electrically conductive shunt 38 of a length sufficient to bridge the proximate end portions of the conductor rails to be connected together, the connecting shunt being provided at its opposite ends with ferrules or sleeves 39—39 pressed into a triangular shape corresponding to the main body shape of the previously described solid splice bar 20. These end sleeves 39—39 are respectively nested in the upper channels 12—12 of the connected rails and are each securely clamped, mechanically and electrically, to an end portion of each rail by a clamp bar 40 and bolts 41 similar to those employed in the case of the splice bar. As clearly appears in FIG. 11 the compressed sleeved ends of the connecting shunt 38 are tapped for threaded reception of the clamping bolts 41. This fixed type of expansion joint is sometimes necessary to accomodate building or support structure expansion and in long systems subject to relatively extreme temperature variations.

HIGH AMPERAGE ISOLATING JOINT

Figure 8:
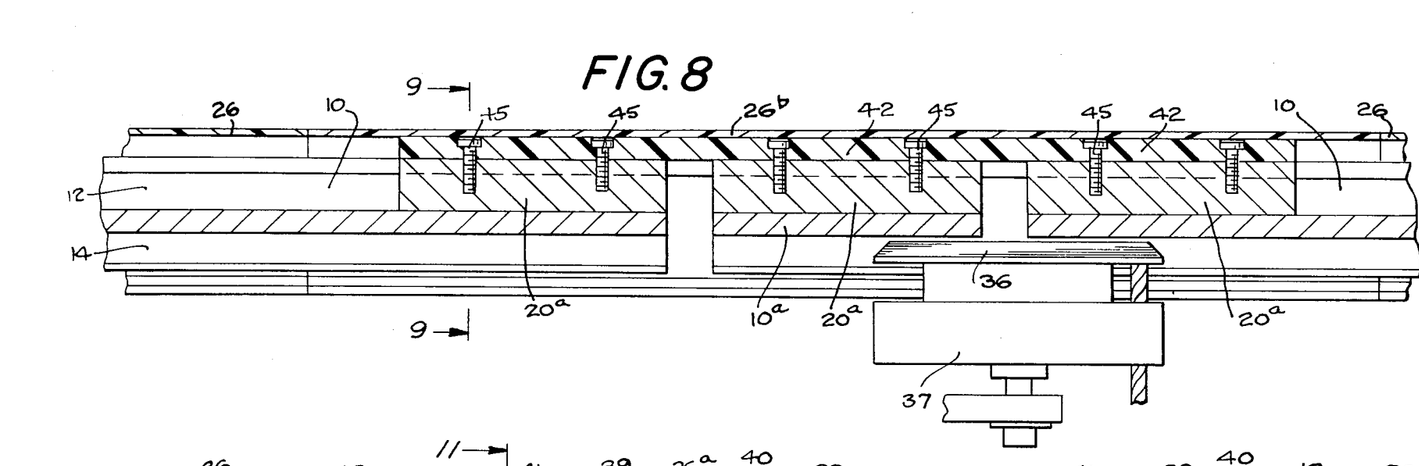
FIG. 8 is a longitudinal sectional view showing an assembly of the current conductor bars or rails of the present invention to provide the current conductor system with sections which are electrically isolated from one another.

Similarly, as shown in FIGS. 8 and 9, a separately cut short length of the insulating sheath, designated 26b, may be fitted between modular lengths of the conductor sheathing to insulatingly cover an isolating joint for sectionalizing or dividing the conductor rail system into individually electrically energized sections. Such isolating joints are sometimes used to allow portions of the system to be electrically disconnected while operations continue on other like sections and such a joint may be inserted at any point on the system in place of a splice joint as previously described. In this instance, the isolating joint consists of a short section 10a of the rail disposed between and in spaced relation to the proximate ends of a pair of longitudinally alined conductor rails 10—10. The end portions of the rails 10-10 and the intervening rail section 10a are each fitted with an insert 20a similar in all respects to the splice member 20 used for the splice joint shown in FIG. 6. These inserts 20a are all insulatingly joined together by an elongated clamp member 42 rigidly formed of a suitable material having high dielectric value as well as a high strength to weight ratio and high beam strength, which clamp member 42, as best shown in FIG. 9, is of a generally semi-circular cross-sectional shape having its bottom surface formed with a longitudinally extending recess 43 for reception of the upwardly projecting ribs 21 of the inserts 20 and the upper lips 17—17 of the rail. This insulating clamp member 42 is of a conformation in cross-section adapting it to be snugly received in the upper region of the longitudinally extending plenum 29 formed in the top of the insulating sheath 26 and is provided with longitudinally spaced bolt holes 44 through which bolts 45 are projected for threaded engagement with the rail sections as shown, whereby upon tightening these bolts the several spaced sections of the rail are securely clamped together in longitudinally alined insulated relation. It will be noted, as see FIG. 8, that the space between each of the opposite ends of the intermediate rail section 10a and the proximate end of its adjoining rail 10 is such as to provide an insulating air gap of a length less than the length of the current collector shoe 36 and that the overall length of the space between the insulated ends of the adjoining rails 10—10 is greater than the length of the collector shoe. Consequently, as said shoe travels from one sectionalized part of the rail system to its next adjoining part, e.g., from the right hand rail 10 of FIG. 8 to the left hand rail 10 thereof, it does not bridge the isolated sections of the rail system but yet is fully supported against assuming any such tilted or other disoriented position as might impede its uninterrupted smooth travel between the isolated adjoining sections of the conductor rail system. This isolating joint may be inserted at any point on the system in place of the above described splice joint.

As in the above described splice and expansion joint assemblies, this last described isolating joint assembly is completely housed within and insulatingly covered by the rounded top portion of the insulating sheathing for the conductor rails.

HIGH AMPERAGE END FEEDER ASSEMBLY

Figure 3:
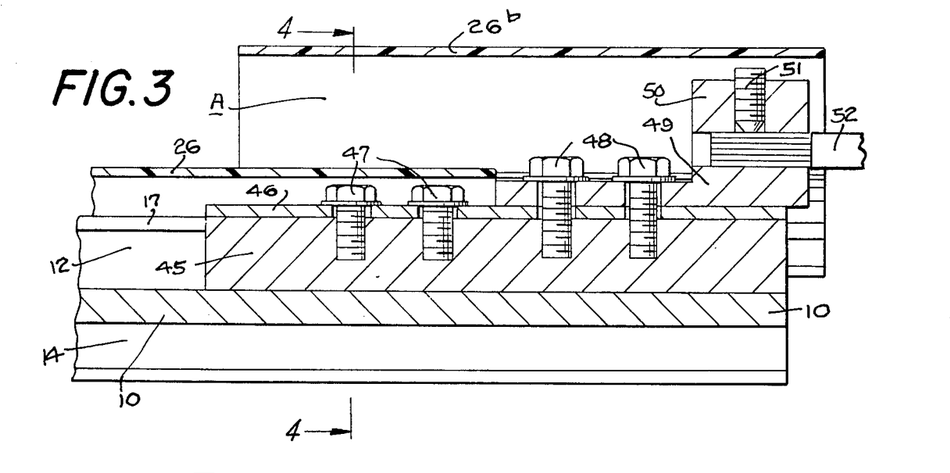
FIG. 3 is a longitudinal sectional view of a conductor bar and feeder assembly as taken along the line 3—3 of FIG. 1.
Figure 4:
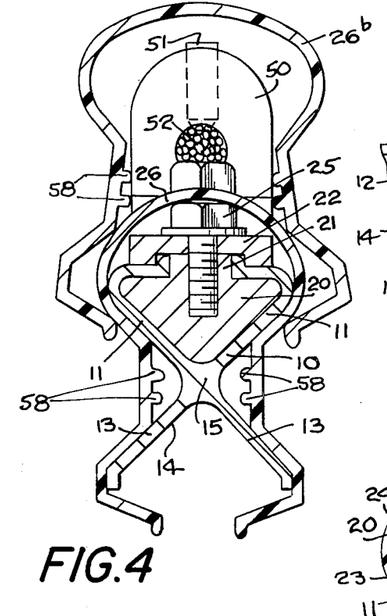
FIG. 4 is a transverse sectional view of the conductor bar and feeder assembly as taken along the line 4—4 of FIG. 3.

FIGS. 3 and 4 illustrate an end feeder assembly to provide electrical power to an end of the system embodying the sheathed conductor rails of the present invention. In this feeder assembly, the end of the conductor 10 has fitted into its upper V-shaped channel section 12 a feeder bar 45 which in transverse section is the same as that of the previously described splice bar 20 and is similarly clamped to the conductor rail by an electrically conductive clamp bar 46 and bolts 47—47. Secured to an end portion of the feeder bar 45, as by the bolts 48—48 threaded into the feeder bar (as see FIG. 3) is a cable lug 49 having an upstanding apertured part 50 to which is secured, by the set screw 51, the end of a power supply cable 52. The insulating sheath 26 which normally would cover the full length of the conductor rail, in this instance terminates short of the end of the rail to expose its end portion for attachment thereto of the cable lug 49. After attachment of this cable lug 49 to the exposed end portion of the conductor rail, the end feed assembly, including the cable lug and all of its associated parts, are covered by an auxiliary sheath 26b which is cut to a length required for such coverage. This supplemental insulating sheath 26b, because of its flexibility, is adapted to be snap-fitted or slipped over the end portion of the underlying main conductor sheath 26 (as see FIG. 4) with the bottom opposed inwardly facing C-shaped channels thereof respectively embracing opposite sides of the rounded closed top portion of said main sheath 26.

HIGH AMPERAGE CENTER FEEDER ASSEMBLY

Figures 5, 18, 19, 20:
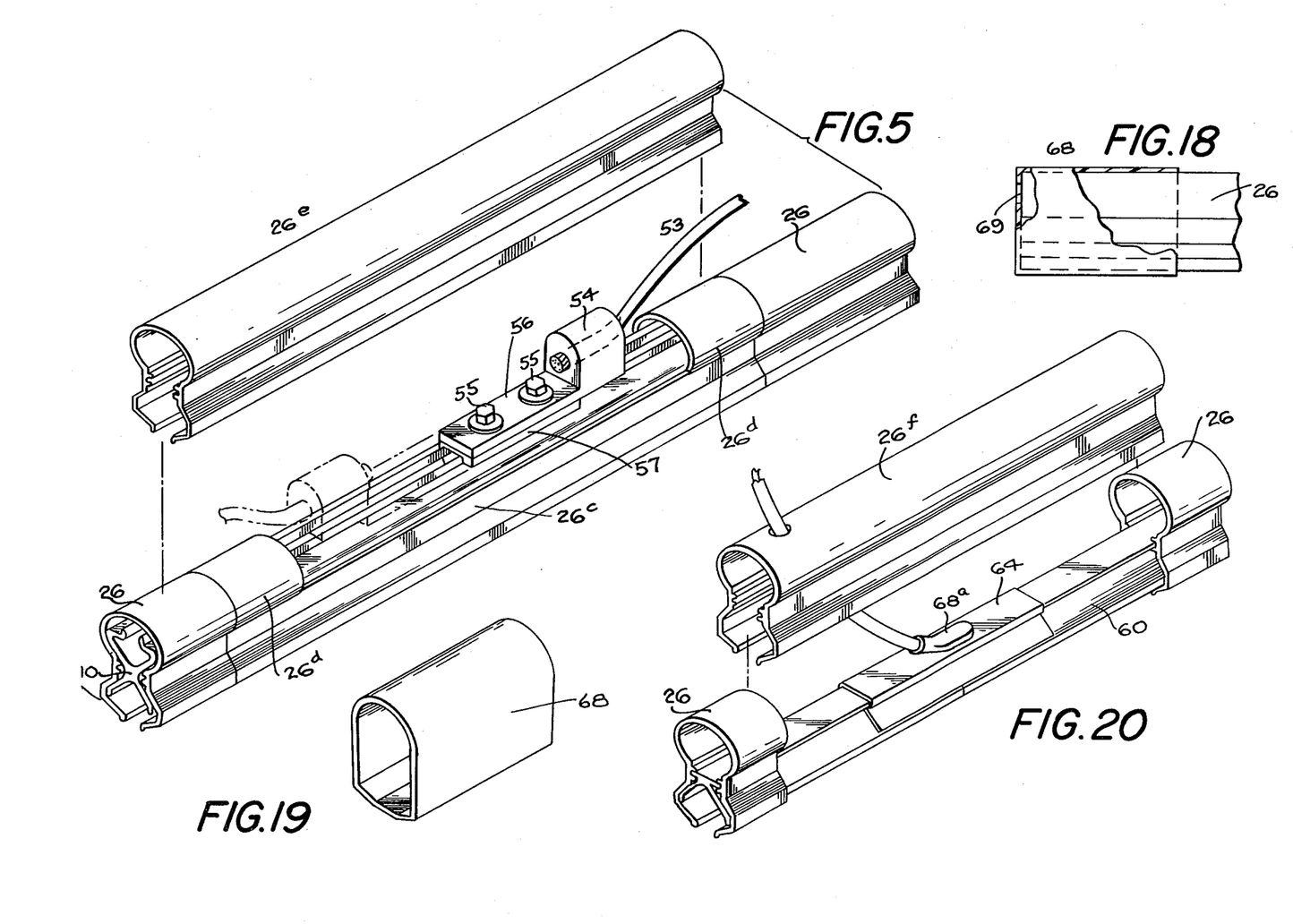
FIG. 5 is an exploded perspective view showing the current feeder connection to the current conductor bar and the insulating sheaths for protectively covering the said connection.
FIG. 18 is a side elevational view, partially in section, showing an end cap such as may be used to close off the end of a rail assembly as shown in FIG. 14.
FIG. 19 is a perspective view showing the open slip-on end of the end cap of FIG. 18.
FIG. 20 is an exploded perspective view of the spliced conductor bars or rails of FIG. 14 showing a sheathed feeder assembly which includes the splice joint itself as a part of the feeder assembly.

FIG. 5 illustrates a center feed assembly which may be provided for supplying electrical power to a conductor rail 10 at any point along its length. In this case, the main conductor sheaths 26 are spaced apart to receive between their spaced ends an interfitted section 26c thereof the rounded top portion of which is cut away to provide it with a pair of longitudinally spaced end parts 26d—26d to provide a space therebetween in which the conductor rail 10 is exposed for securing thereto a power supply feed cable 53 by means of a cable lug 54 secured to the top of the rail by bolts 55—55 which are threaded into an insert (not shown) of the same cross-sectional shape as that of the previously described solid splice bar. These bolts 55—55 commonly project through the flat body portion 56 of the cable lug disposed flatwise against an undercut clamp member 57 similar to that employed in conjunction with the splice bar 20 of FIGS. 6 and 7.

The cable lug 54 may be positionally adjusted along the exposed portion of its underlying rail or reversed end for end as illustrated by its dotted line representation in FIG. 5. Thereafter, all of this exposed portion of the conductor rail and its feed assembly, including the cable lug 54 secured thereof, is covered by a supplementary section 26$^c$ of the insulating sheath by the simple expedient of springing the opposite flexible side walls thereof over the spaced end parts 26$^d$—26$^d$ of the cutaway sheath section 26$^c$ interfitted between the main conductor sheaths 26 of modular lengths. It will be noted that in this intermediate current supply feeder assembly of FIG. 5 the assembled sheaths 26$^c$ and 26$^e$ provide therebetween a longitudinally extending openended space or plenum similar to that designated A in the arrangement of the end type feeder assembly of FIGS. 3 and 4 so that the insulated end portion of the cable 53 which is electrically connected to the conductor rail by the lug 54 freely extends out of said space through one or the other of its open ends.

As in the case of the end feeder assembly of FIGS. 3 and 4, the space or plenum formed by the assembled sheaths 26$^c$ and 26$^e$ is of a vertical depth and transverse girth sufficient to insulatingly accomodate therein all of the parts of the feeder assembly which project upwardly beyond the crowned top of the modular main sheaths which insulatingly enclose the conductor rails themselves. Also it will be noted that the sheaths, both those employed mainly to cover uninterrupted lengths of the conductor rails as well as those employed as auxiliary sheaths to cover the feed assemblied having raised components, such as the cable connecting lugs above described, are of exactly the same cross-sectional shape and dimensions and have the same side wall flexing capacity as enables them to be spread apart sufficiently to permit one sheath to be superimposed upon the other as shown most clearly in FIGS. 1 and 4. Of course, any of the relatively short auxiliary sheaths may be cut to its required length out of any longer length sheath.

LOW AMPERAGE INSULATED CONDUCTOR BAR

It will be observed that the insulating sheath 26 is internally provided with a pair of longitudinally extending parallel ribs 58—58 integrally formed on the inner face of each of the laterally spaced parallel intermediate portions 30—30 of the sheath side walls to provide a pair of opposed inwardly presenting longitudinally extending grooves 59—59. While these grooves have no function in respect to the full X-shaped conductor rails 10 hereinbefore described, they do have a function in respect to the modified construction of the conductor rail as shown in FIGS. 14 to 17 and 20 presently to be described for use in systems which require the supply of a relatively moderate amount of electrical energy (e.g. —90 amperes). Thus, the insulating sheath 10 with its said pair of internal grooves 59—59 may be used as an insulating cover for either form of the conductor rail.

Figures 14, 15, 16, 17:
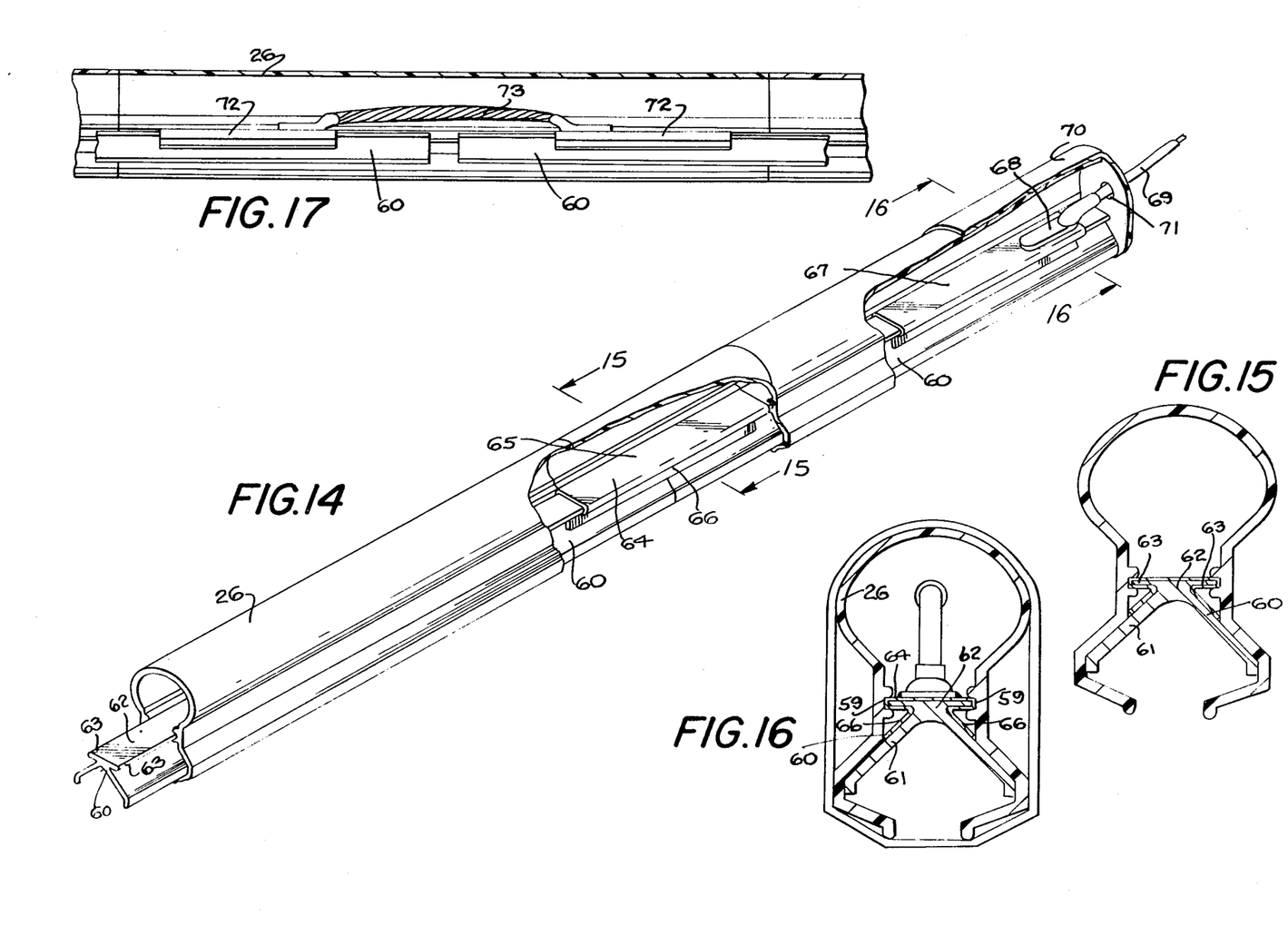
FIG. 14 is a perspective view of a modified form of the conductor rail with portions of its sheathing removed to show a splice joint between a pair of adjoining lengths of the conductor bars or rails and to show the current feeder assembly as used at an end of one of the conductors of the system.
FIG. 15 is a transverse sectional view taken on the line 15—15 of FIG. 14.
FIG. 16 is a transverse sectional view taken on the line 16—16 of FIG. 14.
FIG. 17 is a longitudinal sectional view showing the expansion joint assembly for the modified form of the conductor bar or rail.

Referring now to FIGS. 15 to 17, it will be observed that the modified low amperage construction of the conductor bar or rail 60 includes a bottom section 61 of inverted substantially V-shaped cross-section exactly the same as that of the full X-shaped rail 10 previously described, which section similarly serves as a track for the current collecting shoe movable along the rail. However, in lieu of the upwardly projecting branches 11—11 of the rail 10 forming the upwardly presenting V-shaped channel 12 thereof, the modified rail 60 is provided with a flat top portion 62 formed by a pair of coplanar flanges 63—63 which freely project laterally from opposite sides of the track section 61 in the region of its apex. It will be noted that these flanges 63—63 are respectively adapted to be received in the internal grooves 59—59 of the insulating sheath 26 when the latter is applied to the rail 60 as an insulating cover therefor.

SPLICE JOINT FOR LOW AMPERAGE CONDUCTOR BARS

FIGS. 14 and 15 illustrate the number of splicing together in end-to-end alined relation a longitudinally alined pair of the modified conductor rails 60. This splice assembly includes a splice member 64 formed of a spring metal sheet material having a high electrical conductivity, such as berylium copper, which is of a shape as shown adapting it to be snap-fitted over or longitudinally slipped onto adjoining end portions of the rails to be spliced. The splice member 64 is formed as shown to provide it with an elongated flat top portion 65 and correspondingly elongated reversely bent side portions 66—66 which respectively overlie and intimately engage the complementally shaped external surfaces of the rails to be joined together. The guage of the spring metal of which the splice member 64 is formed is of an order such that when it is fitted on the adjoining ends of the rails (as see FIGS. 14 and 15), the opposite edges of the splice assembly are each of an overall thickness which permits these edges to be adequately seated in the aforesaid internal grooves 59—59 of the conductor rail insulating sheath.

LOW AMPERAGE END FEEDER ASSEMBLY

FIGS. 14 and 16 illustrate the use of a strip 67 of the aforesaid spring metal of the same cross-sectional shape and guage as that of the splice member 64 for supplying electric power from its source to the conductor rail 60. To this end, the strip 67, which is sprung over or slipped onto the flat top of the rail has soldered or otherwise secured thereto a lug 68 to which a power supply cable 69 may be connected. FIG. 14 shows the feeder assembly disposed at the end of a current conducting rail and in such case it is preferred to insulatingly enclose the feeder assembly by an end cover 70 (as see also FIGS. 18 and 19), one of which may be provided for each extremity of the sheathed conductor. The closed end of this cover, formed of any suitable insulating material, such as neoprene or other moldable plastic, may be provided with an aperture 71 for extension therethrough of the power supply cable 69.

LOW AMPERAGE INTERMEDIATE FEEDER ASSEMBLY

FIG. 20 illustrates the application of a center feed assembly to a conductor bar or rail 60 of the modified construction. Such a center feed assembly may be inserted at any point in the system in lieu of the splice joint assembly shown in FIGS. 14 and 15 as above described. In this instance, a center feed cable lug 68$^a$ is welded or otherwise suitably secured electrically to the splice member 64 and the feed assembly is covered by a short section 26' of the insulating sheath fitted between the main sheaths 26—26 which cover the spliced conductor bars. This intermediate sheath 26' is provided with an aperture through which the power supply cable may extend as shown.

LOW AMPERAGE EXPANSION JOINT ASSEMBLY

FIG. 17 illustrates use of elongated strips of the same material and cross-section as of the above described splice member 64 to provide a flexible expansion joint between spaced ends of adjoining lengths of the modified form of conductor rail 60. As shown, a pair of such strips 72—72 are respectively fitted upon the proximate end portions of the rails to be joined together, which strips are interconnected by a flexible cable 73 having its opposite ends electrically connected to the strips 72—72 by means of terminal lugs electrically secured thereto.

It will be noted that in the above described arrangements of FIGS. 14 and 17, the upper cavity or plenum formed by the crowned top part of the rail insulating sheaths is of sufficient overall size to accomodate those parts of the feeder assembly (FIG. 14) and of the expansion joint assembly (FIG. 17) which project above the top of the insulatingly sheathed conductor rails 60 and thus for this modified construction of rail there is no need to employ any auxiliary sheaths as in the case of the previously described rails 10 of full X-shaped cross-section.

CONDUCTOR BAR SUPPORT STRUCTURES

The insulated sheath 26 which covers the conductor rail is of a transverse contour which lends itself to use not only as insulating covers for the various splice joints, feeders, current collector trolleys and other auxiliary accessories necessary for operation of the conductor system, but also as the means for mounting of the rails in the conductor system. FIGS. 1 and 2 show a three phase conductor system wherein the several longitudinally extending insulated conductor rails 10 thereof are collectively supported in spaced parallel relation by insulating hanger members 74 formed of any suitable insulating highly dielectric material that is standard in the electrical insulator industry. These hanger members 74 may be formed as single unitary blocks (as shown in FIGS. 1 and 2) or as split blocks having a pair of mating parts 74ª—74ª (as shown in FIGS. 12 and 13). In either case, the hangers 74 are internally shaped to provide the same with a longitudinally extending slotted recess 75 having rounded top and side wall surfaces which respectively conform in shape to the corresponding external surfaces of the closed top portion of the conductor sheath 26.

The hanger members 74 are each provided in the top body portion thereof with a pair of outwardly presenting longitudinally extending grooves or channels 76 which are respectively adapted to be received in the lipped channels 77—77 of a metal supporting beam 78 which is suitably mounted, as shown in FIG. 1, to extend transversely across the tops of the sheathed conductor rails 10. As many of these beams 78 as may be required to adequately support the rails may be provided at longitudinally spaced points of conductor installation.

In the three phase system of FIG. 1, three unitary hanger members 74, each first individually slipped on to the insulating cover of a conductor rail, are successively inserted into the channeled support beam 78 and are secured therein in transversely alined abutting relation by end angle clips 79—79 secured to the beam by screws or bolts 80. This rail mounting procedure is repeated at each of the spaced mounting points for the conductor system. Preferably, the clips 79—79 are each slidably adjusted in position along the transversely extending support beam so as to secure the array of sheathed conductors in accurately spaced parallel relation to the line of travel of the work utility to which electrical power is supplied from the system through the current collector assembly 37 carried by the work utility.

In certain instances it may be preferred to use the above mentioned split insulating hangers or anchors as shown in FIG. 12. When these split hangers are used, they may be slipped into the support beam 78 with the two half-sections 74ª—74ª of each hanger spread apart sufficiently to receive therebetween the rounded top portion of the insulating sheath 26 of an individual conductor rail, whereupon the two half-sections of each hanger may then be pressed together to closely embrace the sheathed conductor bar about which they are fitted and securely locked in rail-supporting condition by the positionally adjustable end angle clips 77—77. Since each of the sheathed conductor bars is provided with its own hanger member, either of the one piece or the split construction described, any one or more of the sheathed conductors may thus be operatively mounted in a securely fixed position.

It will be understood that the present invention is susceptible of various changes and modifications which may be made from time to time without departing from its principles or the real spirit thereof and accordingly it is intended to claim the same broadly as well as specifically as indicated by the appended claims.

What is claimed as new and useful is:

1. In an insulated electrical conductor system for supplying electric energy to electrically energizable movable work utilities having current collecting shoes movable along the conductors of the system, in combination,
    a plurality of elongated current conductor bars longitudinally alined and joined together in end-to-end relation to provide a substantially continuous conductor of any desired length for supplying current to a slidable collector shoe in contact therewith,
    each of said bars being of a multi-branched transverse cross-section having a centrum body part from which commonly project a top and a bottom pair of laterally spaced branches respectively disposed symmetrically with reference to the longitudinally extending vertical median plane of said bar,
    said bottom pair of said laterally spaced branches being downwardly divergent from said centrum body part to define therebetween a downwardly presenting open-bottomed guide channel of substantially inverted V-shape which serves as a part of said continuous track of the system, and
    an inverted substantially U-shaped covering sheath of electrical insulating material embracingly fitted over each of said conductor bars, said sheath being of a uniform shape in transverse cross-section throughout the full length thereof so as to adapt it to be disposed in end-to-end abutting alinement with an adjoining conductor-bar covering sheath, each of said insulating sheaths having laterally spaced side walls and a crowned top closure wall bridging said side walls and being formed of a material having an inherent resiliency enabling its side walls to be sprung into close-fitting engagement with the conductor bar embraced thereby, said side walls of said sheath respectively terminating in a pair of opposed skirt portions to provide inwardly presenting channels of generally C-shaped configuration which respectively closely overlie the external surfaces of said downwardly divergent branches of said conductor bar and extend inwardly across the bottom edges of said guide channel of the conductor bar to thereby provide the sheath with a longitudinally extending bottom slot of a width substantially less than the cross-wise distance between said bottom edges of said guide channel and the overall width of the shoe movable therein whereby the sheath, except for its said bottom slot, completely encloses the conductor bar and the current collector shoe in contact therewith and prevents accidental dislodgement of said shoe from within the confines of said insulating sheath, the upper portions of the sheath side walls being outwardly and upwardly expanded to conjointly form with said crowned top wall of the sheath a longitudinally extending plenum to provide the sheath with a free space therein located substantially above the uppermost reaches of said top pair of laterally spaced branches of said conductor bar and of a volumetric capacity sufficient to accomodate therein various auxiliary devices which are attachable to said top branches of said conductor bar and have parts projecting vertically above the top horizontal plane thereof, said side walls being respectively internally formed to closely embrace and springably receive therebetween the said laterally spaced branches of the conductor bar about which said sheath is fitted.

2. In an insulated electrical conductor system according to claim 1 wherein said side walls of said insulating sheath are respectively indented in the intermediate regions thereof to closely embrace therebetween the opposite side of said centrum body part of the conductor bar, said top pair of said laterally spaced branches of said conductor bar extend oppositely in horizontal coplanar relation to either side of said centrum body part of said conductor bar and said indented regions of said insulating sheath are respectively provided with inwardly presenting integrally formed grooves extending along the full length of the sheath for receiving therein the opposite longitudinally extending side edges of said coplanar branches of the conductor bar, the walls of said grooves having an inherent resiliency as being downwardly divergent from said centrum body part to define therebetween a downwardly presenting open-bottomed guide channel of substantially inverted V-shape which serves as a part of said continuous track of the system, and an inverted substantially U-shaped covering sheath of electrical insulating material embracingly fitted over each of said conductor bars, said sheath being of a uniform shape in transverse cross-section throughout the full length thereof so as to adapt it to be disposed in end-to-end abutting alinement with an adjoining conductor-bar covering sheath, each of said insulating sheaths having laterally spaced side walls and a crowned top closure wall bridging said side walls and being formed of a material having an inherent resiliency enabling its side walls to be sprung into close-fitting engagement with the conductor bar embraced thereby, said side walls of said sheath respectively terminating in a pair of opposed skirt portions to provide inwardly presenting channels of generally C-shaped configuration which respectively closely overlie the external surfaces of said downwardly divergent branches of said conductor bar and extend inwardly across the bottom edges of said guide channel of the conductor bar to thereby provide the sheath with a longitudinally extending bottom slot of a width substantially less than the cross-wire distance between said bottom edges of said guide channel and the overall width of the shoe movable therein whereby the sheath, except for its said bottom slot, completely encloses the conductor bar and the current collector shoe in contact therewith and prevents accidental dislodgement of said shoe from within the confines of said insulating sheath, enables then to be spread apart sufficiently to close embrace and frictionally retain therein the opposite free edges of said coplanar branches of the conductor bar.

3. In an insulated conductor system according to claim 2 wherein said conductor bar is fitted with a connector assembly which includes an elongated member having its opposite side portions channel shaped in transverse cross-section to respectively receive the opposite end portions of said top pair of laterally spaced coplanar branches, the channel-shaped side portions of said member having angularly extending depending flanges which respectively embrace and intimately engage the surfaces of the conductor bar immediately adjoining said centrum body part, and wherein said elongated member is formed of electrically conductive spring metal adapting it to be sprung over the top and about the opposite sides of said conductor bar.

4. In an insulated conductor system according to claim 1 wherein said top pair of laterally spaced branches of the conductor bar respectively extend upwardly and outwardly in divergent relation from said centrum body part to provide said conductor bar with an upwardly presenting channel of substantially V-shape in transverse cross-section and wherein said branches of the conductor bar respectively terminate in a pair of opposed inturned flanges having free edges spaced equidistantly from said median plane of the bar to partially enclose the top of said channel and thereby provide the bar with a longitudinally extending cavity having a slotted top wall extending along the full length thereof, said top-wall slot being centered midway between the opposite sides of said channel.

5. In an insulated conductor system according to claim 4 wherein said top pair of laterally spaced upwardly diverging branches of the conductor bar are generally of inverted L-shape in cross-section having their shorter legs disposed in substantially horizontal coplanar relation with their free edges spaced apart to locate said longitudinally extending slot centered between the diverging longer leg portions of said branches.

6. In an insulated conductor system according to claim 5 wherein the free edges of said laterally spaced coplanar legs of said diverging branches of the conductor bar respectively terminate in upstanding substantially parallel lips which define therebetween the said longitudinally extending slot.

7. In an insulated conductor system according to claim 4 wherein said conductor bar is fitted with a connector assembly which includes an elongated insert member nested in said conductor bar cavity, said insert member being complementally externally shaped in conformity with the internal shape of cavity for intimate electrical engagement of its external surfaces with the corresponding internal surfaces of said cavity, said insert having an elongated upwardly projecting rib closely fitted in the slot of said cavity, an elongated clamp member extending lengthwise of and commonly overlying the slotted top wall of said cavity and said rib fitted in said slot, and means for tightly clamping the slotted top wall of the conductor bar cavity between said insert and said clamp member.

8. In the conductor system according to claim 4 which includes a connector member nested in the cavity of said conductor bar and a clamp member disposed top-side of said slotted top wall of said cavity in straddling relation to the slot thereof and in overlying longitudinally registering relation to said connector member and means projecting through said cavity top wall slot for tightly clamping said slotted top wall between said clamp member and said connector member.

9. In the conductor system according to claim 8 wherein said connector member extends in bridging relation across the abutting ends of a pair of said longitudinally alined connector bars to provide an electrically conductive fixed splice joint therebetween.

10. In the conductor system according to claim 8 wherein the proximate ends of a pair of said conductor bars are disposed in longitudinally spaced relation and are each fitted in the channel thereof with one of said connector members and wherein said connector members are flexibly electrically connected to provide an expansion joint between said adjoining conductor bars.

11. In the conductor system according to claim 8 wherein the proximate ends of a pair of said conductor bars are disposed in longitudinally spaced relation and are each fitted in the channel thereof with one of said connector members and wherein said connector members are each fixedly secured within the channel of its associated conductor bar by an elongated insulating bar which extends across the gap between said conductor bars and is disposed top-side of the slotted top walls of said conductor bar channels to commonly clamp therein said connector members whereby to provide an electrically insulated joint between said spaced pair of conductor bars.

12. In a current conducting system of the character described, a current conductor bar of a uniform transverse cross-section throughout its length having a bottom guide channel for a current collector in slidable contact with the underside of said bar and a pair of branches respectively extending upwardly and outwardly in divergent relation to provide the top of said bar with a longitudinally extending cavity of substantially V-shape in transverse section, the outer ends of said divergent branches being respectively provided with inturned coplanar flanges which respectively terminate in substantially parallel upstanding lips spaced equidistantly from the vertical median plane of the conductor bar, thereby providing the topside cavity of said conductor bar with a top wall part having a longitudinally extending slot centered midway between the opposite sides of the bar.

13. In current conducting system according to claim 12 wherein said topside cavity of the conductor bar is fitted with a connector assembly which includes an elongated insert member nested in said conductor bar cavity, said insert member being complementally externally shaped in conformity with the internal shape of cavity for intimate electrical engagement of its external surfaces with the corresponding internal surfaces of said cavity and having an elongated upwardly projecting rib closely fitted in the slot of said cavity, an elongated clamp member extending lengthwise of and commonly overlying the slotted topwall of said cavity and said rib fitted in said slot, and means for tightly clamping the slotted top wall of the conductor bar cavity between said insert and said clamp member.

* * * * *